United States Patent
Rogillio

(10) Patent No.: US 11,576,345 B2
(45) Date of Patent: Feb. 14, 2023

(54) FEEDER

(71) Applicant: William Eugene Rogillio, Walker, LA (US)

(72) Inventor: William Eugene Rogillio, Walker, LA (US)

(73) Assignee: Feeder Tree, L.L.C., Walker, LA (US)

( * ) Notice: Subject to any disclaimer, the term of this patent is extended or adjusted under 35 U.S.C. 154(b) by 285 days.

(21) Appl. No.: 16/905,034

(22) Filed: Jun. 18, 2020

(65) Prior Publication Data

US 2020/0396960 A1   Dec. 24, 2020

Related U.S. Application Data

(60) Provisional application No. 62/862,915, filed on Jun. 18, 2019.

(51) Int. Cl.
*A01K 5/02* (2006.01)

(52) U.S. Cl.
CPC ................ *A01K 5/0225* (2013.01)

(58) Field of Classification Search
USPC ............ 119/53, 52.1, 51.01, 52.4, 57.92
See application file for complete search history.

(56) References Cited

U.S. PATENT DOCUMENTS

| | | | | |
|---|---|---|---|---|
| 5,333,572 | A * | 8/1994 | Nutt | A01K 5/0225 239/397.5 |
| 6,988,464 | B1 * | 1/2006 | Rutledge | A01K 5/0114 119/51.01 |
| 7,421,834 | B1 * | 9/2008 | Doolan | B65B 43/54 222/452 |
| 7,900,660 | B2 * | 3/2011 | Ladson | B65B 5/067 141/10 |
| 8,893,654 | B2 * | 11/2014 | Wisecarver | A01K 5/0225 119/51.11 |
| 2005/0241588 | A1 * | 11/2005 | Foster | A01K 61/80 119/57.91 |
| 2010/0132616 | A1 * | 6/2010 | Rieger | A01K 5/0225 119/57.91 |
| 2013/0047927 | A1 * | 2/2013 | Chang | A01K 39/014 119/51.01 |
| 2014/0131468 | A1 * | 5/2014 | Meritt | E01C 19/203 239/681 |
| 2016/0029592 | A1 * | 2/2016 | Springer | G08C 17/02 119/51.11 |
| 2016/0257481 | A1 * | 9/2016 | Milner | A01K 5/0225 |
| 2017/0273275 | A1 * | 9/2017 | Gale | A01K 5/0135 |
| 2018/0049403 | A1 * | 2/2018 | McAdams | A01K 5/002 |
| 2019/0037803 | A1 * | 2/2019 | Christie | A01K 39/014 |
| 2019/0099779 | A1 * | 4/2019 | Farmer | E01C 19/203 |
| 2020/0045942 | A1 * | 2/2020 | Pfeiff | A01K 5/0275 |
| 2020/0187453 | A1 * | 6/2020 | Chodacki | A01K 5/0225 |

OTHER PUBLICATIONS

Moltrie, Instructions for Moultrie Wildlife Directional Kit with Programmable Digital Timer, MFG-13224_Wildlife Directional KIT_ 2018 Manual-ENGLISH_12-18-18.

* cited by examiner

*Primary Examiner* — Yvonne R Abbott-Lewis

(74) *Attorney, Agent, or Firm* — John Edel; Edel Patents LLC

(57) ABSTRACT

Directional feeders having a feed slide, a feed pocket and multiple flappers on a rotor are disclosed. The rotor may be configured to have a horizontal axis of rotation such that gravity conveys feed down the feed slide to a feed pocket which redirects the feed into a rotor housing.

19 Claims, 8 Drawing Sheets

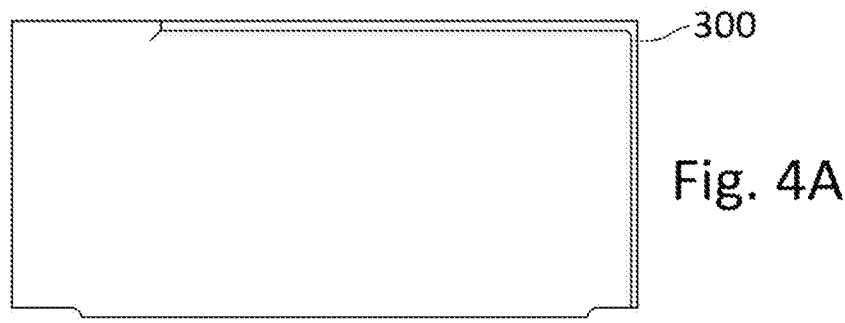
Fig. 4A
Fig. 4B
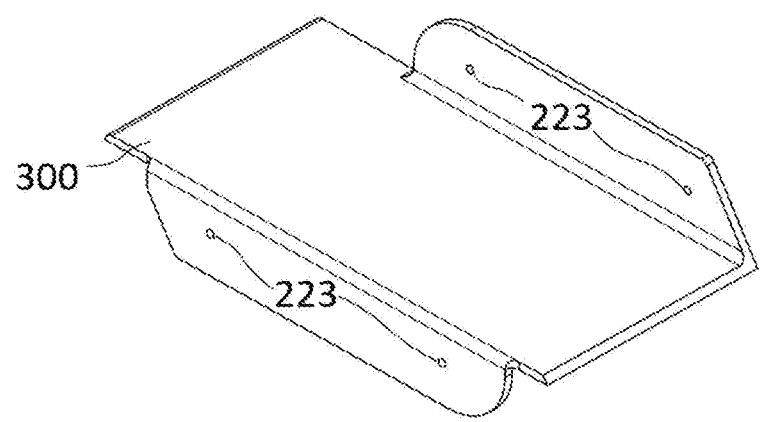
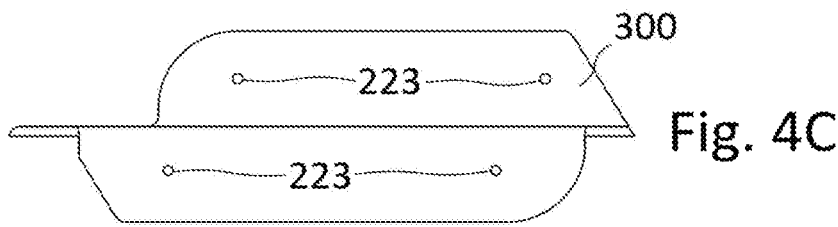
Fig. 4C
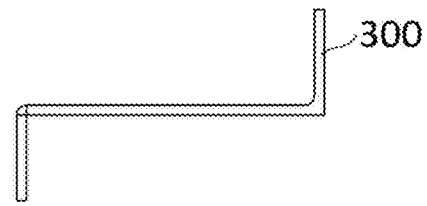
Fig. 4D

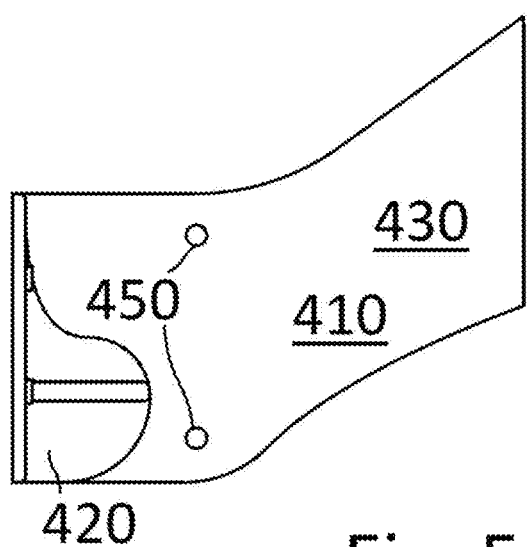
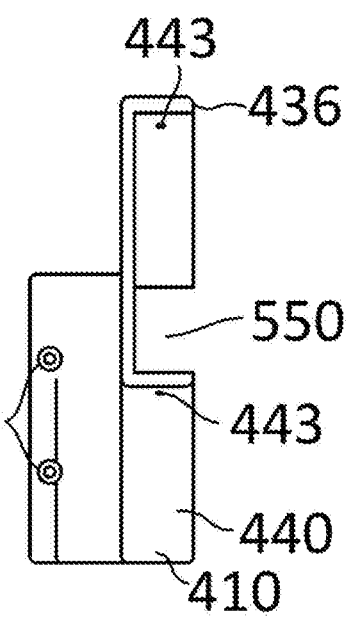
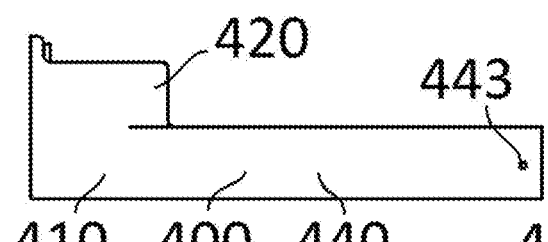
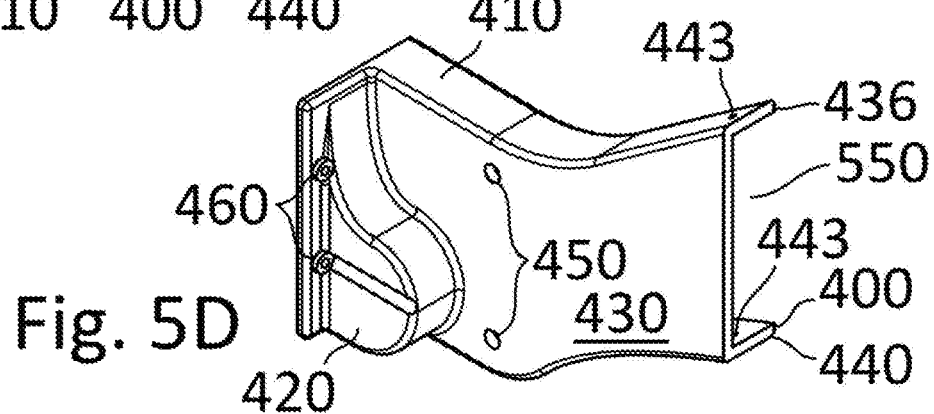
Fig. 5A
Fig. 5B
Fig. 5C
Fig. 5D

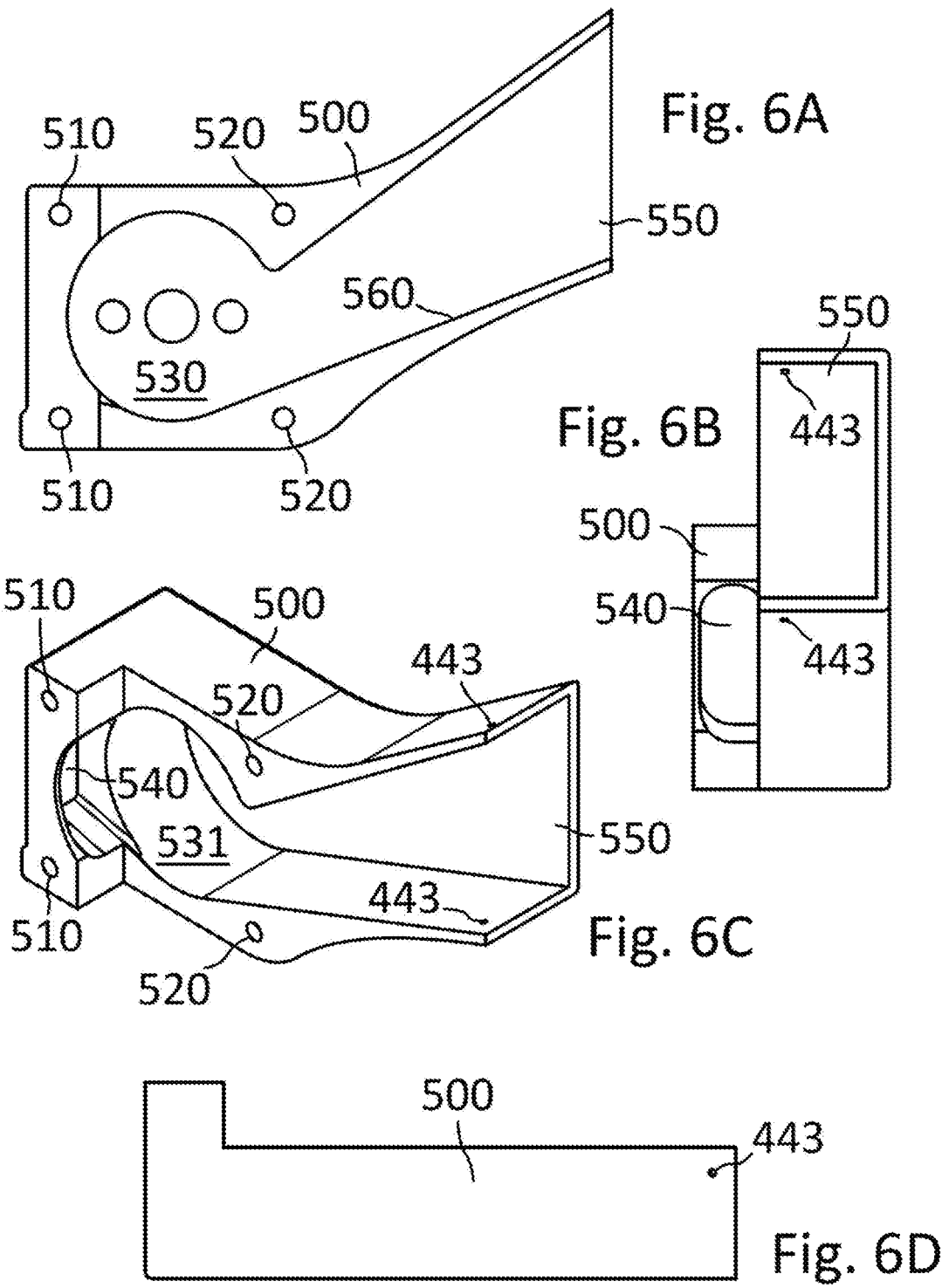

FEEDER

This application claims the benefit of provisional application No. 62/862,915 filed on Jun. 18, 2019 and entitled Feeder.

Feeders described herein may be used in the feeding of wildlife and other animals. Certain feeders disclosed herein may have improved distribution of feed over a distance.

BRIEF DESCRIPTION OF THE DRAWINGS

FIG. 4A is a bottom view of the hopper cover.
FIG. 4B is a bottom perspective view of the hopper cover.
FIG. 4C is a side view of the hopper cover.
FIG. 4D is a front view of the hopper cover.
FIG. 5A is a side elevation view of the first spout side.
FIG. 5B is a front elevation view of the first spout side.
FIG. 5C is a bottom plan view of the first spout side.
FIG. 5D is a perspective view of the first spout side.
FIG. 6A is a side view of the second spout side.
FIG. 6B is a front view of the second spout side.
FIG. 6C is a perspective view of the second spout side.
FIG. 6D is a bottom view of the second spout side.

DETAILED DESCRIPTION

Example 1

Figure 1:
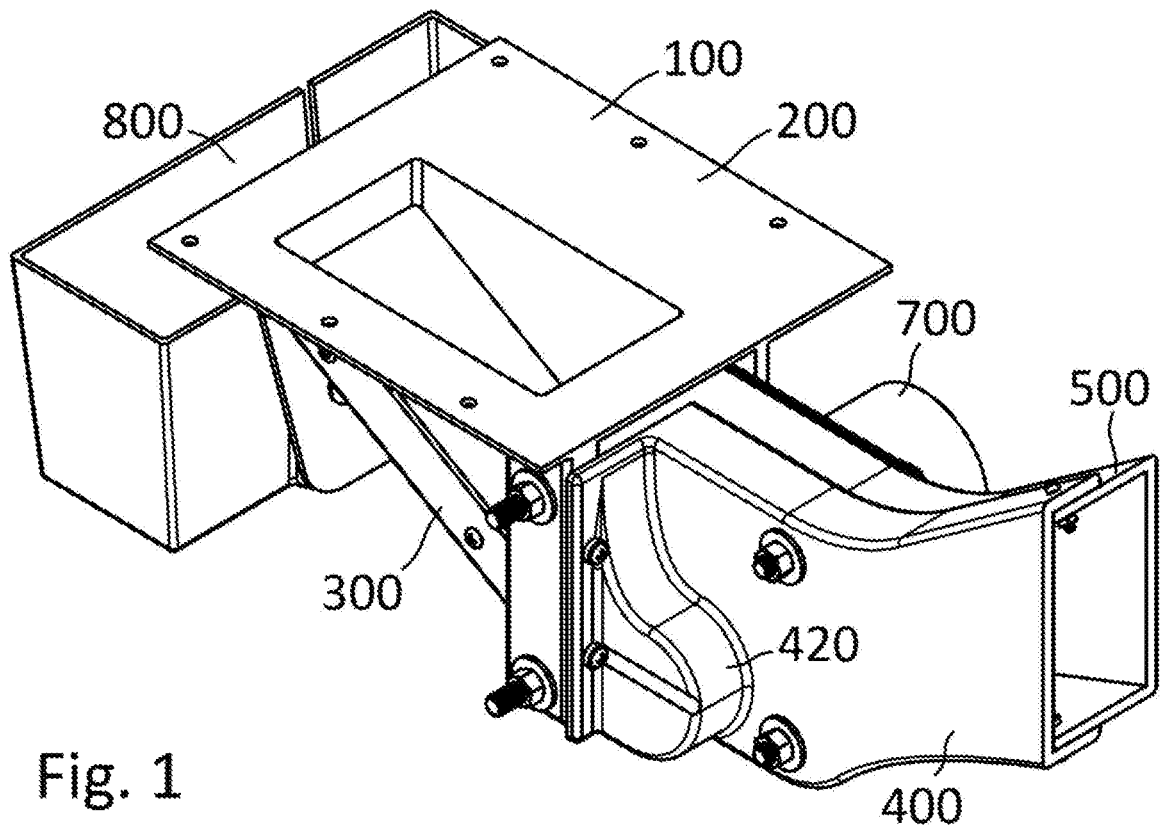
FIG. 1 shows a perspective view of the feeder assembly.
Figure 2:
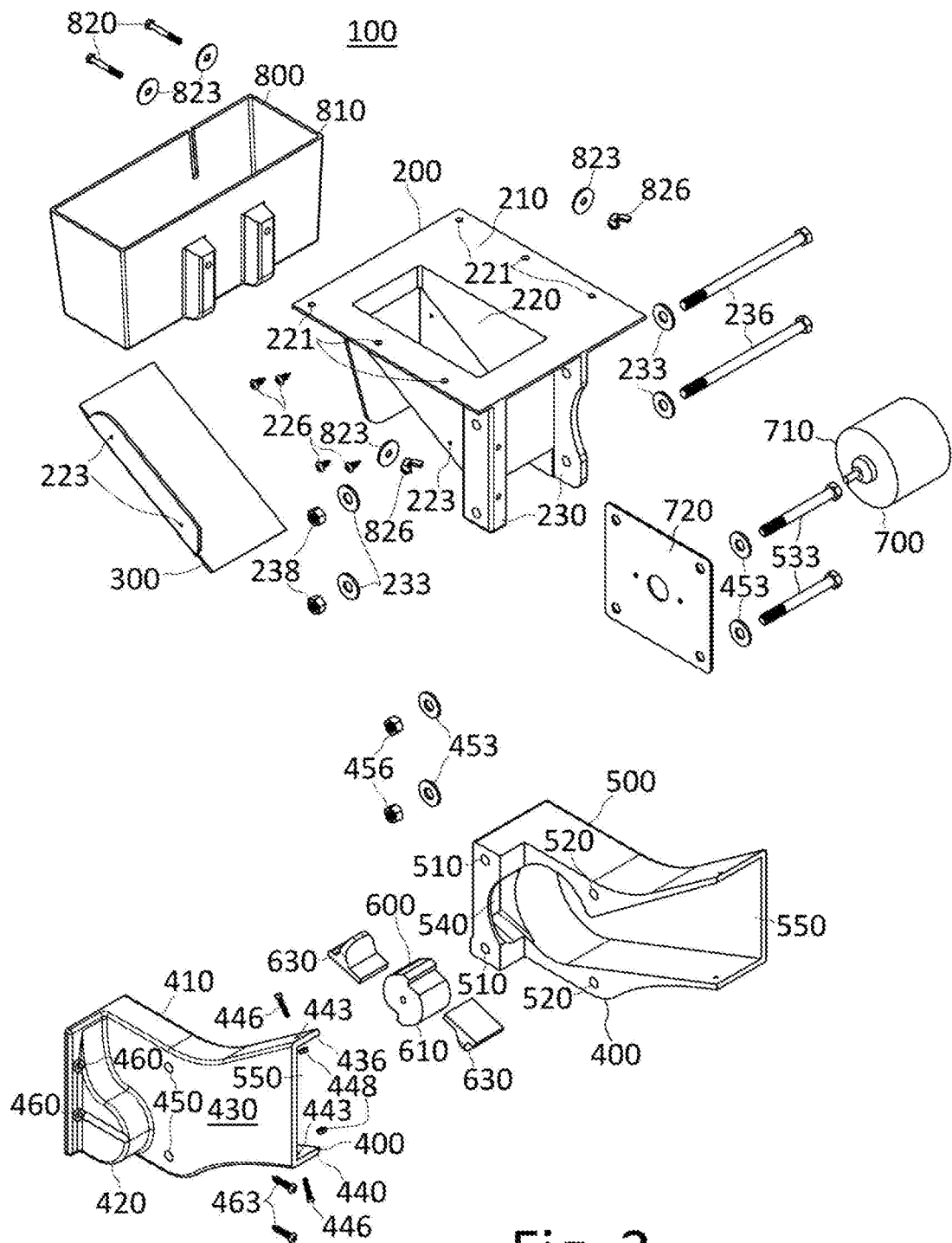
FIG. 2 shows an exploded view of the feeder assembly.
Figure 3A:
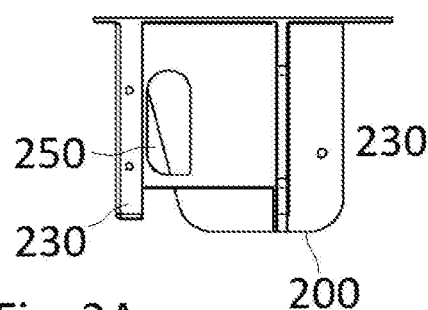
FIG. 3A shows a front view of the hopper base.
Figure 3B:
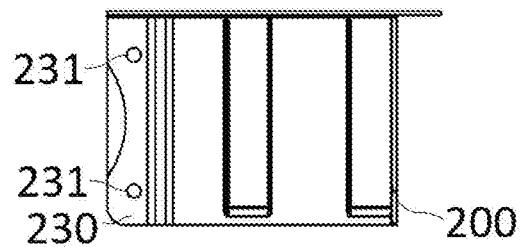
FIG. 3B shows a side view of the hopper base.
Figure 3C:
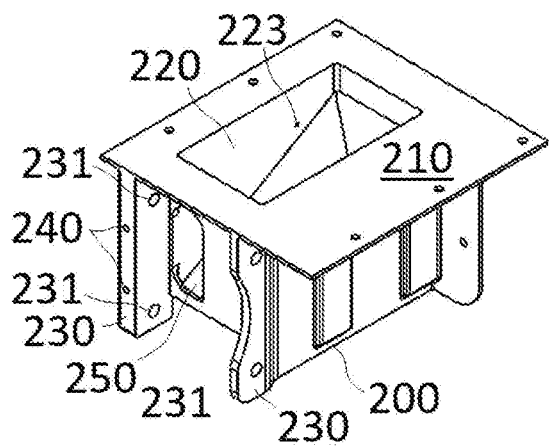
FIG. 3C shows a front perspective view of the hopper base.
Figure 3D:
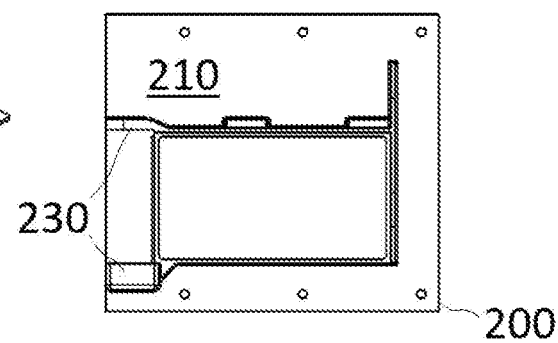
FIG. 3D is a bottom plan view of the hopper base.
Figure 3E:
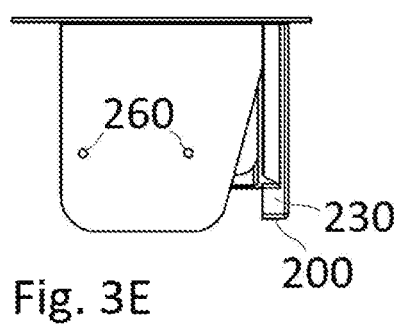
FIG. 3E is a rear view of the hopper base.
Figure 3F:
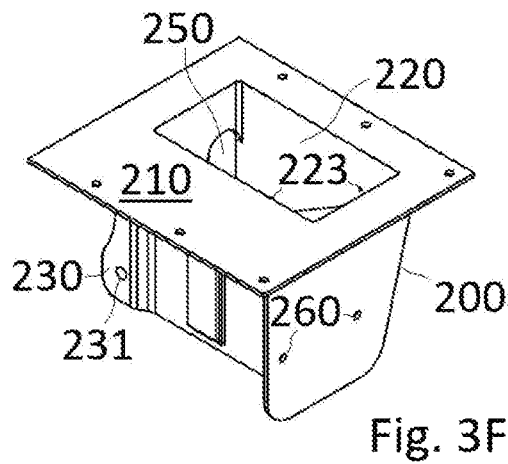
FIG. 3F is a rear perspective view of the hopper base.
Figure 7A:
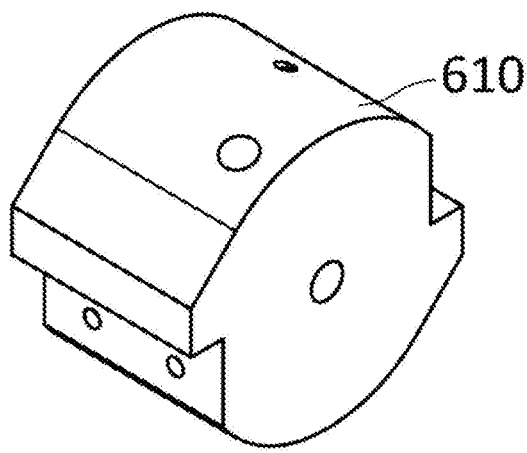
FIG. 7A is a perspective view of the rotor hub.
Figure 7B:
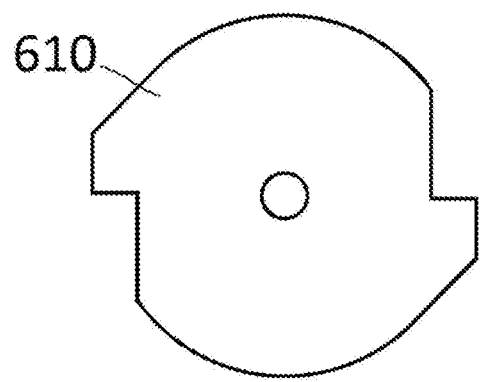
FIG. 7B is a side elevation view of the rotor hub.
Figure 7E:
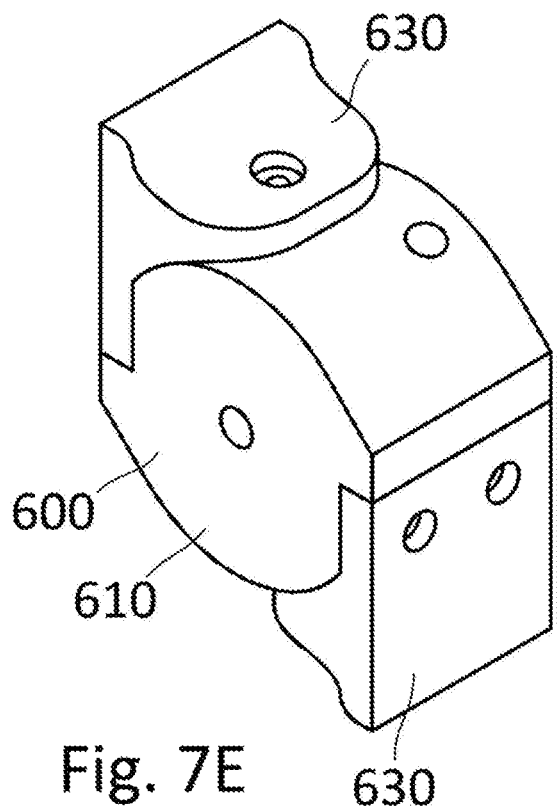
FIG. 7E is a perspective view of the rotor assembly.
Figure 7C:
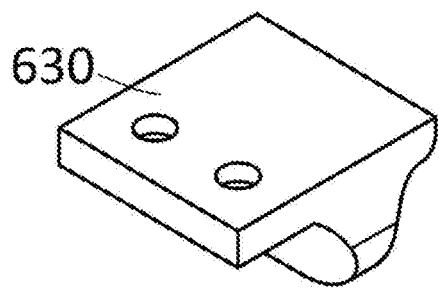
FIG. 7C is a perspective view of the flapper.
Figure 7D:
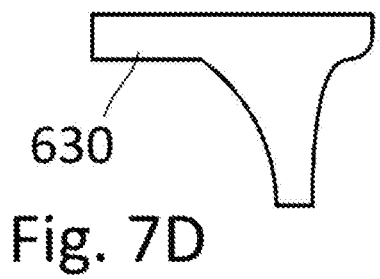
FIG. 7D is a side elevation view of the flapper.

Feeder assembly 100 may include Hopper base 200, Hopper cover 300, Spout 400, Rotor assembly 600, Motor assembly 700 and Battery assembly 800. As depicted in the figures, Hopper base 200 may include a Top plate 210, Primary chute 220, Top plate screw holes 221, Hopper cover screw holes 223, Hopper cover screws 226, Spout attachment bolting plates 230, Spout attachment washers 233, Spout attachment bolts 236, Spout attachment nuts 238 and Hopper feed orifice 250. Hopper cover 300, may attach to the bottom of Hopper base 200. Spout 400, may include a First spout side 410 and a Second spout side 500 which fit together. Components associated with First spout side 410 may include Rotor feed pocket 420, First spout side wall 430, First spout side upper plate 436, First spout side lower plate 440, Spout end bolt holes 443, Spout end bolts 446, Spout end nuts 448, Spout joining bolt holes 450, Spout joining washers 453, Spout joining nuts 456, Sheet metal screw connector holes 460 and Sheet metal screws 463. Components associated with Second spout side 500 may include Spout base connecting bolt holes 510, Spout joining bolt holes 520, Rotor cavity 530, Rotor cavity wall 531, Spout joining bolts 533, Opening to feed pocket 540, Spout exit opening 550 and Spout exit floor 560.

Hopper base 200 may include Top plate 210 which may serve as the base and connection point for a feed hopper to supply grain or other feed to Feeder assembly 100. That grain would then fall through Primary chute 220 toward Hopper feed discharge opening 250. Hopper cover screw holes 223 are used as attachment points for Hopper cover 300. Spout attachment bolting plates 230 contain Spout connection bolt holes 231 which are used to connect the spout to Hopper base 200. Sheet metal screw holes 240 are also used to secure the spout to Hopper base 200. Battery box attachment holes 260 are used in the attachment of the battery box.

Rotor assembly 600, may include a Rotor hub 610 and Flappers 630. Motor assembly 700, may include a Motor 710 and a Motor attachment plate 720. Battery assembly 800, may include a Battery box 810, Battery box bolts 820, Battery box attachment washers 823 and Battery box wing nuts 826.

Feeder assembly 100 may be arranged as part of a larger feeding apparatus in which Feeder assembly 100 is positioned a distance above the ground which may be a few feet and a feed container is positioned above Hopper base 200. Top plate 210 may be used to secure Feeder assembly 100 to either a feed container or another structural component of the larger feeding apparatus. Primary chute 220 is configured to operate by gravity feed from a feed container. Hopper cover 300 serves as a sloped bottom of the cavity created inside of Primary chute 220. Hopper cover 300 is secured to Hopper base 200 by way of Hopper cover screw holes 223 and Hopper cover screws 226. In operation, Hopper cover 300 may be characterized as a feed slide as feed would slide down the inclined plane toward Rotor feed pocket 420. Spout attachment bolting plates 230 serve as rigid substantially vertical supports and Spout connection bolt holes 231 are positioned on Spout attachment bolting plates 230 so that Spout 400 may be bolted to Hopper base 200 by way of Spout attachment washers 233, Spout attachment bolts 236 and Spout attachment nuts 238. Spout attachment bolts 236 pass-through Spout connection bolt holes 231 and Spout joining bolt holes 450 as they join Spout 400 to Hopper base 200. Further, Sheet metal screw connector holes 460 and Sheet metal screw holes 240 are configured to align so that Sheet metal screws 463 may further secure Spout 400 against Hopper base 200. Hopper feed discharge opening 250 is the orifice through which feed enters Rotor feed pocket 420. Spout 400 includes First spout side 410 and Second spout side 500. Rotor feed pocket 420 is part of First spout side 410 and is where feed is introduced after passing through Hopper feed orifice 250 and Opening to feed pocket 540. First spout side 410 may contain First spout side wall 430 and Rotor feed pocket 420. Rotor feed pocket 420 is filled by gravity and the fluid like motion of the feed. Feed tumbles from Opening to feed pocket 540 to fill voids within Rotor feed pocket 420. First spout side upper plate 436 and First spout side lower plate 440 both bracket and partially surround Second spout side 500 such that a single Spout exit opening 550 is created. Spout end bolt holes 443, Spout end bolts 446 and Spout end nuts 448 fix First spout side 410 and Second spout side 500 relative to one another at Spout exit opening 550. Spout exit opening 550 is oriented such that Spout exit floor 560 slopes back to Rotor cavity 530. Spout joining bolt holes 450 and Spout joining bolt holes 520 are used to join First spout side 410 and Second spout side 500 using Spout joining bolts 533, Spout joining washers 453 and Spout joining nuts 456. Second spout side 500 includes Spout base connecting bolt holes 510 which align with Spout connection bolt holes 231 which in turn are joined by Spout attachment bolts 236. Feed passes through Hopper feed orifice 250 then passes through Opening to feed pocket 540 ending up within Rotor feed pocket 420. Rotor assembly 600 may comprise Rotor hub 610 and Flappers 630 with Flappers 630 being attached to Rotor hub 610. Rotor hub 610 spins within Rotor cavity 530 with a gap between Rotor assembly 600 and Rotor cavity wall 531. Motor assembly 700 may include Motor 710 and Motor attachment plate 720 which attaches Motor 710 to the Feeder assembly 100. Battery assembly 800 includes Battery box 810, Battery box bolts 820, Battery box attachment washers 823 and Battery box wing nuts 826 which are arranged and configured to securely hold a battery to power Motor 710. Battery box 810 may be configured to be either watertight or weather resistant.

Figure 8:
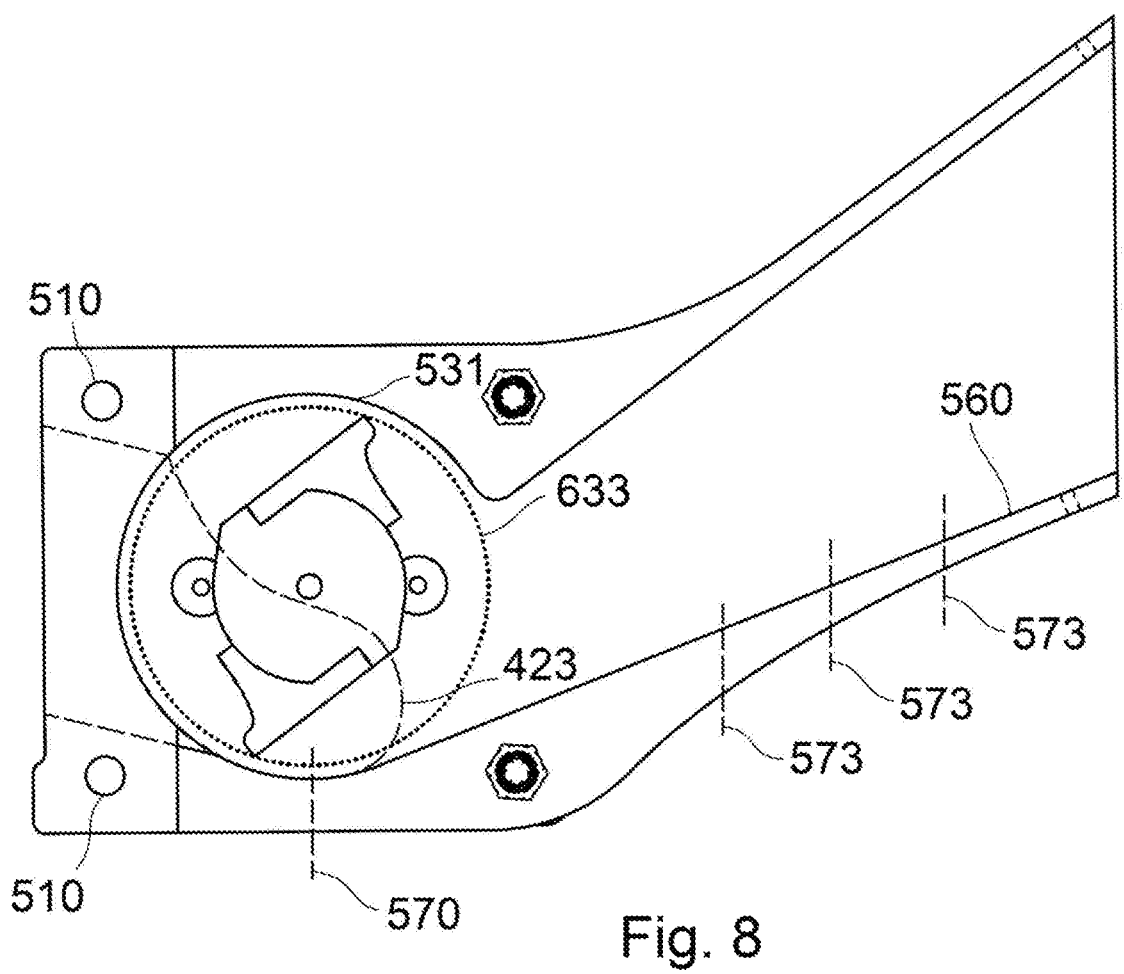
FIG. 8 is a cross section of the rotor inside the spout.

Depicted in FIG. 8 are Spout base connecting bolt holes 510, Rotor cavity wall 531, Feed pocket inner wall 423, Spout exit floor 560, Rotor cavity louver path 570, Spout floor louver paths 573 and Flapper tip path 633. The tolerance between Rotor cavity wall 531 and Flapper tip path 633 may for example be 0.137 inches. Feed pocket inner wall 423 may be arranged such that the cross section of Rotor feed pocket 420 that overlaps with the cross sectional area within Flapper tip path 633 is less than half of the cross sectional area within Flapper tip path 633. Rotor cavity louver path 570 may be a slit path cut out of the bottom of Second spout side 500 and may serve to remove water from rain. Spout floor louver paths 573 may also be slit paths cut out of the bottom of Second spout side 500 and may also serve to remove water from rain. The slit paths may be sized to accommodate rain from typical or even large storms but will generally be narrow enough that feed would not typically get caught in the slits.

Rotor assembly 600 may have an axis of rotation that is parallel to the ground. Rotor assembly 600 may have an axis of rotation that is within 5° of parallel to the ground.

Flappers 630 may be constructed of rubber or other similarly flexible polymers.

First spout side 410 and Second spout side 500 may be constructed of rubber or other similarly flexible polymers.

When assembled, the gap between Flappers 630 and Rotor cavity wall 531 may, for example, be 0.14 inches with certain examples falling between 0.03 and 0.30 inches and a significant number of those examples falling between 0.08 and 0.22 inches.

Flow into Rotor cavity 530 is partially controlled by the rotational position of Rotor assembly 600.

Material exiting Rotor cavity 530 without enough velocity to exit through Spout exit opening 550 returns to Rotor cavity 530.

Feeder assembly 100 is capable of spreading multiple types and sizes of feed.

The feed passes in a first generally horizontal direction through Hopper feed orifice 250 where it enters Rotor feed pocket 420 then passes in a second generally horizontal direction into Rotor cavity 530. The first generally horizontal direction is perpendicular to the second generally horizontal direction.

The center of gravity of the feed in Rotor feed pocket 420 may be at a height lower than the center of gravity of Rotor assembly 600. The center of gravity of the feed in Rotor feed pocket 420 may be at a height that is at least 0.4 inches lower than the center of gravity of Rotor assembly 600. The center of gravity of the feed in Rotor feed pocket 420 may be at a height that is at least 0.2 inches lower than the center of gravity of Rotor assembly 600.

The center of gravity of the feed in Rotor feed pocket 420 may be offset from the axis of rotation of Rotor assembly 600.

Feeder assembly 100 may be set to run on a timer or other control system.

Feed in Rotor feed pocket 420 presses against the Rotor feed pocket 420 facing side of Rotor hub 610 which blocks a portion of the opening between Rotor feed pocket 420 and Rotor cavity 530.

When Rotor assembly 600 is operating the flat faces of Flappers 630 strike the feed such that the feed either bounces from Flappers 630 or is thrown by Flappers 630 ejecting the feed through Spout exit opening 550. As each successive flapper passes, feed is replenished within Rotor cavity 530 filling or partially filling the void cleared by the passing flapper. The feed passing through Hopper base 200 into Rotor feed pocket 420 may flow as a fluid, and may be contiguous in that the particles generally remain in contact with the adjacent particles.

Flappers 630 may have a face that is 1.5 inches long and 1.4 inches wide.

Rotor hub 610 may have a radius of 1 inch with certain points protruding beyond that dimension. Rotor hub 610 may have a width of 1.4 inches.

Hopper feed orifice 250 may be 1.25 inches wide and 3 inches tall.

The entrance to Rotor feed pocket 420 may be 3 inches tall.

The internal radius of Rotor cavity 530 may, for example, be 2.0 inches with certain examples falling between 1.2 and 3.5 inches and a significant number of those examples falling between 1.6 and 2.8 inches.

The slope of Spout exit floor 560 may, for example, be 20.0° above horizontal with certain examples falling between 10.0 and 35.0° above horizontal and a significant number of those examples falling between 15.0 and 27.5° above horizontal. This slope may reduce or eliminate the "burp" of feed associated with many feeders which deposit a quantity of food at the base of the feeder as the feeder starts and stops broadcasting feed.

Spout exit opening 550 may have a height of 4.5 inches and a width of 2.0 inches.

First spout side 410, Second spout side 500 and Rotor assembly 600 may be constructed of rubber or a polyurethane resin. That material may have a 90 A shore hardness.

Directional feeder described herein may, for example, comprise a feed slide that is downward sloping; a feed pocket; a rotor comprising a first flapper and a second flapper; a rotor cavity in which the rotor spins such that the rotor may be arranged and configured to have an axis of rotation and the axis of rotation may be horizontal; the feed slide may be configured to accept a feed from above; the feed slide may be configured to convey the feed, by gravity, to the feed pocket; the feed pocket may be arranged and configured to constrict the flow of the feed from the feed slide; the feed pocket may be located alongside the rotor cavity; a majority of the feed pocket may be located below the axis of rotation; an opening between the feed pocket and the rotor cavity may be intermittently and repeatedly partially blocked by the first flapper during operation of the rotor; the feed pocket may be arranged along a feed path between the feed slide and the rotor cavity such that the feed traveling through the feed pocket changes directions at the feed pocket; and the feed pocket may be smaller than the rotor cavity. In a related example, there may be a feed discharge chute and the feed discharge chute may have a drain. In a related example, the rotor cavity may have a drain. In a related example, the feed slide may be configured such that the feed sliding down the feed slide moves downward and in the direction of a discharge side of the directional feeder. In a related example, a center of the feed cavity may be located vertically below a center of the rotor cavity. In a related example, the first flapper may obscure a portion of the opening between the feed pocket and the rotor cavity when the first flapper reaches its lowest vertical extent of travel. In a related example, the first flapper and the second flapper may alternatingly obscure a portion of the opening between the feed pocket during operation of the rotor. In a related example, a vertical height of the feed pocket may decreases as it approaches a discharge side of the directional feeder. In a related example, the opening between the feed pocket and the rotor cavity may extend below a lowermost path of the first flapper. In a related example, a direction of travel of the feed may change by 90° within the feed pocket. In a related example, a horizontal component of the direction of the feed travel down the feed slide may be in the direction of a feed discharge chute. In a related example, a majority of the volume of the feed cavity may be on the opposite side of a vertical plane passing through the axis of rotation of the rotor from a feed discharge chute. In a related example, the first flapper may be constructed of a polymeric material. In a related example, the first flapper may comprise rubber. In a related example, the first flapper and the second flapper may maintain a fixed position with respect to the rotor as the rotor rotates during operation of the directional feeder. In a related example, the axis of rotation of the rotor may not not extend through the opening between the feed pocket and the rotor cavity. In a related example, the feed slide may be horizontally wider than the rotor housing. In a related example, the feed slide may be horizontally wider than the feed pocket. In a related example, the feed pocket may be held in place adjacent to the rotor cavity by bolts. In a related example, the first flapper may include a flat surface arranged and configured to propel the feed out of a feed discharge chute.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:

1. A directional feeder comprising:
    a. a feed slide that is downward sloping;
    b. a feed pocket;
    c. a rotor comprising a first flapper and a second flapper; and
    d. a rotor cavity in which the rotor spins;
    e. wherein the rotor is arranged and configured to have an axis of rotation and the axis of rotation is horizontal;
    f. wherein the feed slide is configured to accept a feed from above;
    g. wherein the feed slide is configured to convey the feed, by gravity, to the feed pocket;
    h. wherein the feed pocket is arranged and configured to constrict the flow of the feed from the feed slide;
    i. wherein the feed pocket is located alongside the rotor cavity;
    j. wherein a majority of the feed pocket is located below the axis of rotation;
    k. wherein the first flapper obscures a portion of the opening between the feed pocket and the rotor cavity when the first flapper reaches its lowest vertical extent of travel;
    l. wherein an opening between the feed pocket and the rotor cavity is intermittently and repeatedly partially blocked by the first flapper during operation of the rotor;
    m. wherein the feed pocket is arranged along a feed path between the feed slide and the rotor cavity such that the feed traveling through the feed pocket changes directions at the feed pocket; and
    n. wherein the feed pocket is smaller than the rotor cavity.

2. The directional feeder of claim 1 further comprising a feed discharge chute wherein the feed discharge chute comprises a drain.

3. The directional feeder of claim 1 wherein the rotor cavity comprises a drain.

4. The directional feeder of claim 1 wherein the feed slide is configured such that the feed sliding down the feed slide moves downward and in the direction of a discharge side of the directional feeder.

5. The directional feeder of claim 1 wherein a center of the feed pocket is located vertically below a center of the rotor cavity.

6. The directional feeder of claim 1 wherein the first flapper and the second flapper alternatingly obscure a portion of the opening between the feed pocket and the rotor cavity during operation of the rotor.

7. The directional feeder of claim 1 wherein a vertical height of the feed pocket decreases as it approaches a discharge side of the directional feeder.

8. The directional feeder of claim 1 wherein the opening between the feed pocket and the rotor cavity extends below a lowermost path of the first flapper.

9. The directional feeder of claim 1 wherein a direction of travel of the feed changes by 90° within the feed pocket.

10. The directional feeder of claim 1 wherein a horizontal component of the direction of the feed travel down the feed slide is in the direction of a feed discharge chute.

11. The directional feeder of claim 1 wherein a majority of the volume of the feed pocket is on the opposite side of a vertical plane passing through the axis of rotation of the rotor from a feed discharge chute.

12. The directional feeder of claim 1 wherein the first flapper is constructed of a polymeric material.

13. The directional feeder of claim 1 wherein the first flapper comprises rubber.

14. The directional feeder of claim 1 wherein the first flapper and the second flapper maintain a fixed position with respect to the rotor as the rotor rotates during operation of the directional feeder.

15. The directional feeder of claim 1 wherein the axis of rotation of the rotor does not extend through the opening between the feed pocket and the rotor cavity.

16. The directional feeder of claim 1 wherein the feed slide is horizontally wider than the rotor housing.

17. The directional feeder of claim 1 wherein the feed slide is horizontally wider than the feed pocket.

18. The directional feeder of claim 1 wherein the feed pocket is held in place adjacent to the rotor cavity by bolts.

19. The directional feeder of claim 1 wherein the first flapper comprises a flat surface arranged and configured to propel the feed out of a feed discharge chute.

* * * * *